Nov. 10, 1942.  M. M. BRODERSEN  2,301,516
TRACTION POWER OPERATED SCRAPER
Filed May 27, 1940  7 Sheets-Sheet 1

Inventor
Max M. Brodersen

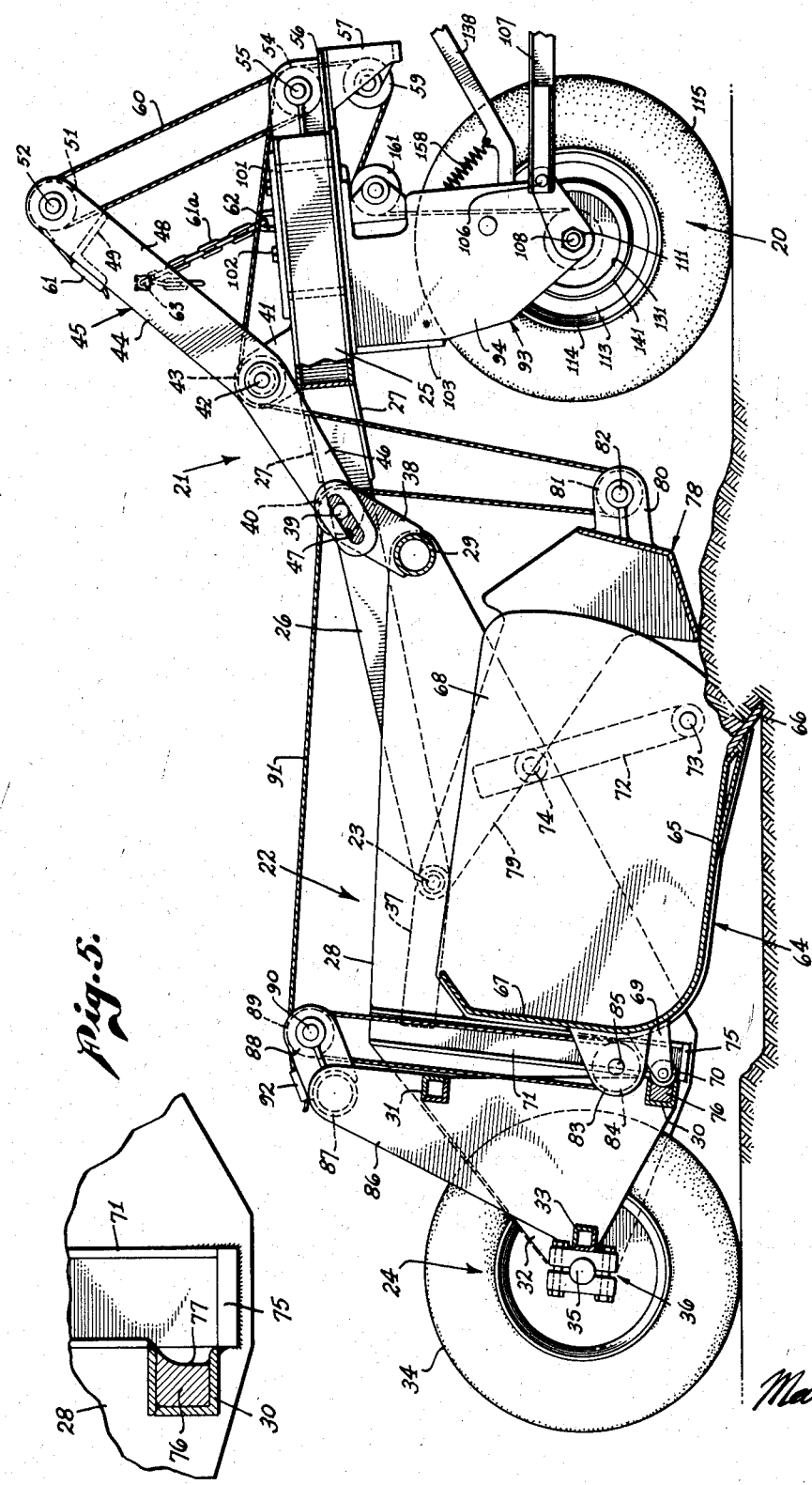

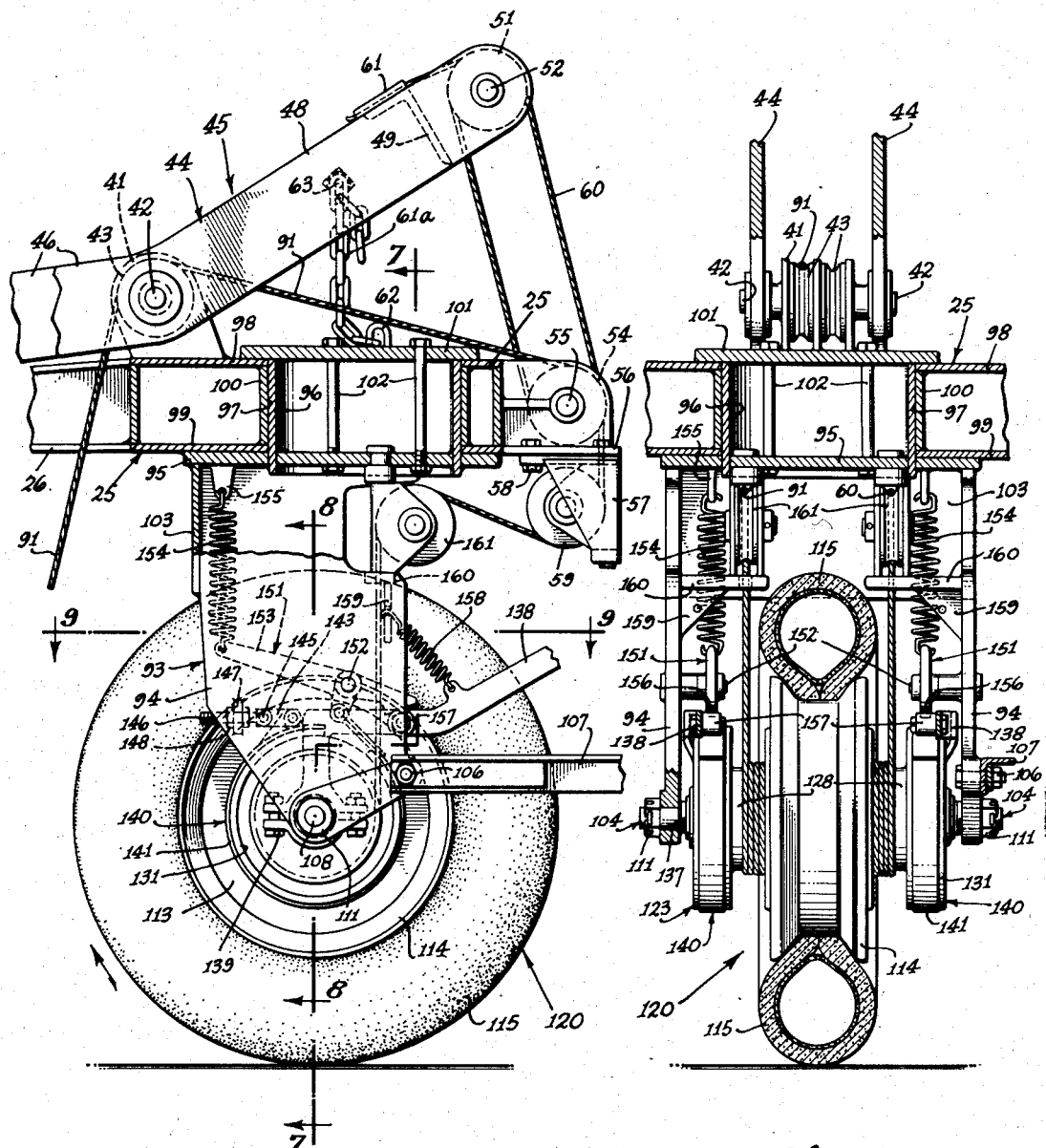

Nov. 10, 1942.  M. M. BRODERSEN  2,301,516
TRACTION POWER OPERATED SCRAPER
Filed May 27, 1940    7 Sheets-Sheet 6
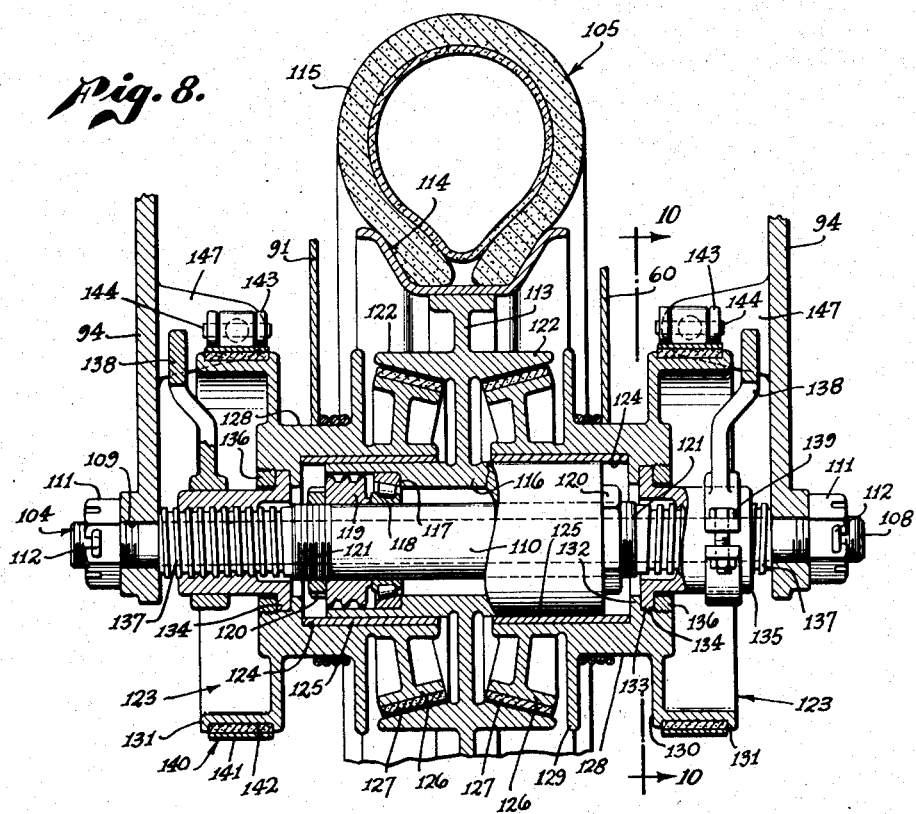
Fig. 8.
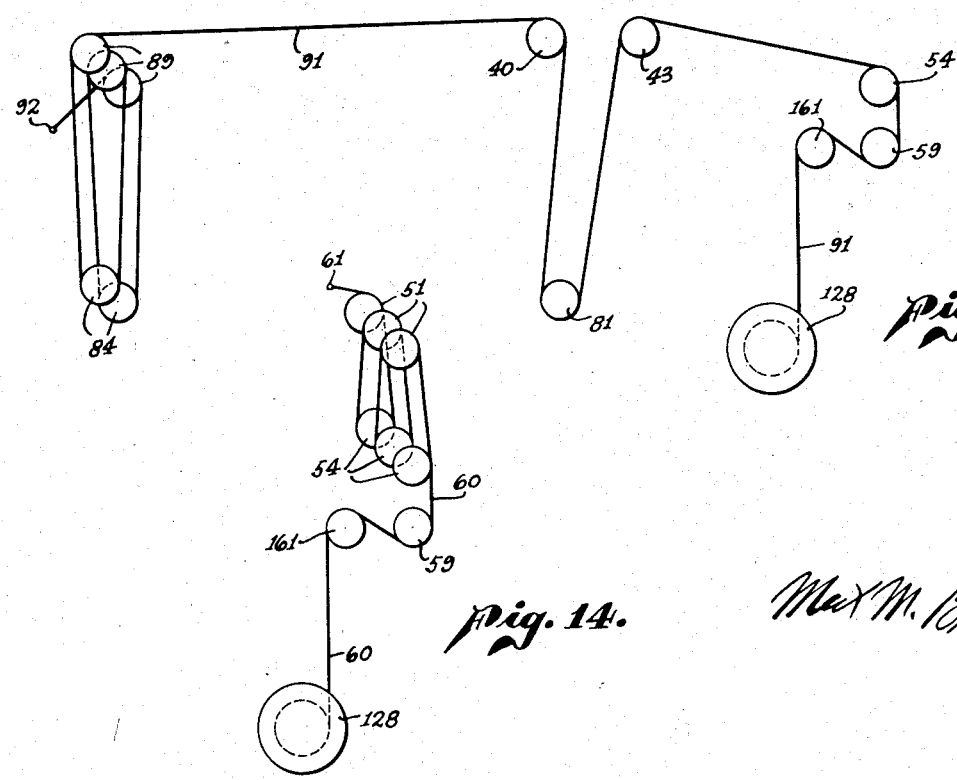
Fig. 13.
Fig. 14.
Inventor
Max M. Brodersen.

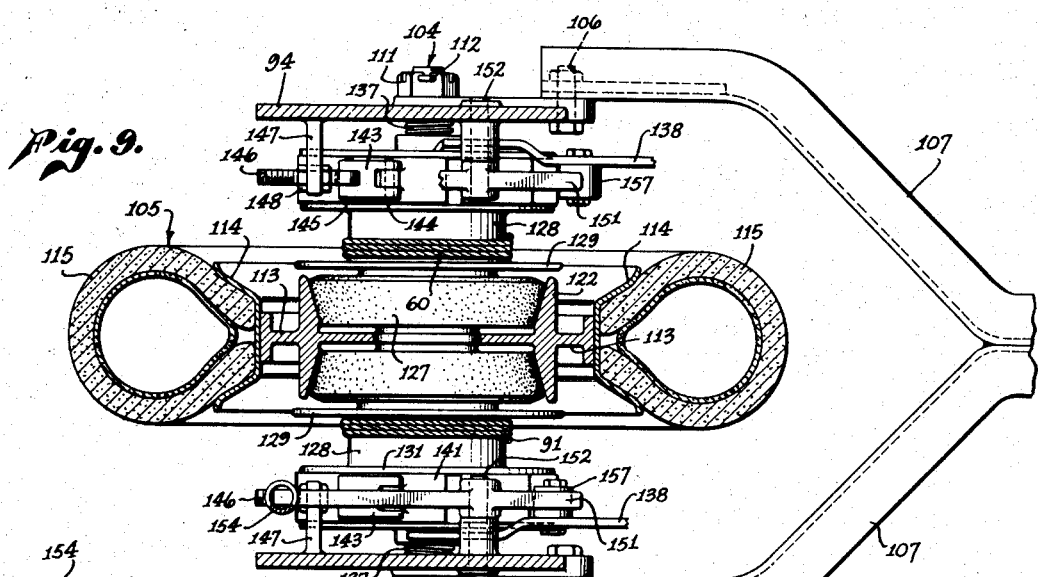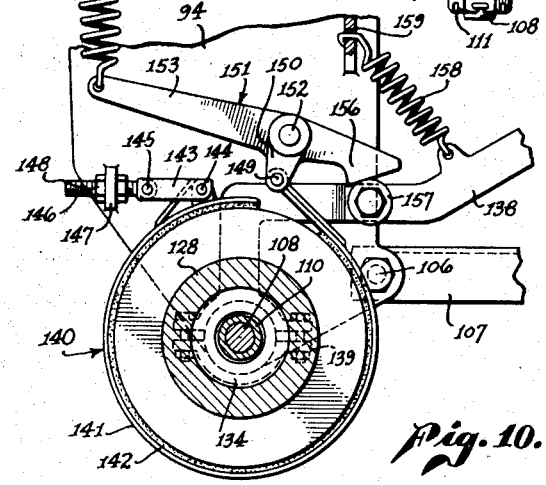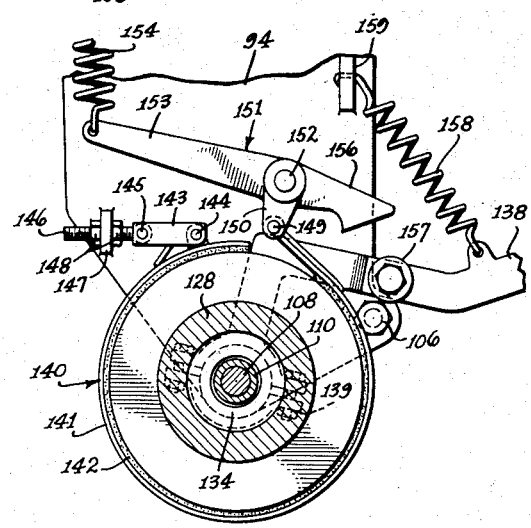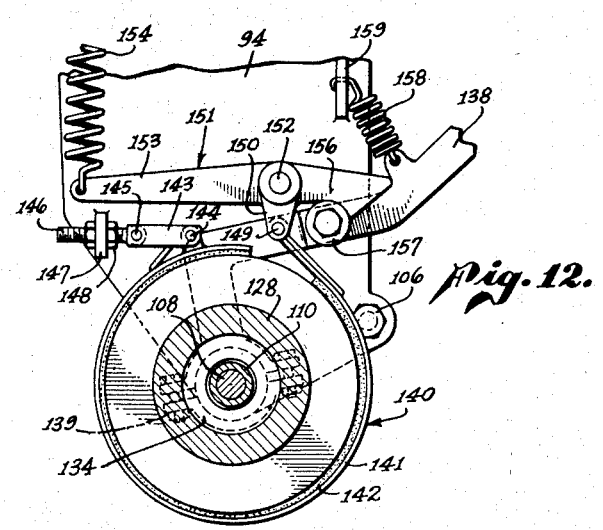

Patented Nov. 10, 1942

2,301,516

UNITED STATES PATENT OFFICE 2,301,516

TRACTION POWER OPERATED SCRAPER

Max M. Brodersen, Alhambra, Calif., assignor to The Slusser-McLean Scraper Company, Sidney, Ohio, a corporation of Ohio Application May 27, 1940, Serial No. 337,466

11 Claims. (Cl. 37—124)

This invention relates to tractor drawn scrapers including a scraper bowl mounted on a frame structure supported at its front and rear ends on wheeled carriages.

The primary object of my invention is to provide a hauling scraper in which the front wheeled carriage includes a traction operated cable power unit for controlling the degree of the various operations of the scraper so that the implement is a complete unit within itself and requires only a simple connection to a tractor for operation.

Heretofore in practice a cable hoist or hydraulic power unit has been mounted on the rear end of a tractor and connected for operation to the power take-off on said tractor, then the cables from said hoist or conduits from said hydraulic power unit were connected to the various instrumentalities on the implement for controlling its operation. This made it extremely difficult to connect and disconnect the implement when it was desired to use the tractor intermittently for other work. When the scraper was disconnected from the tractor and some other implement connected thereto, the cables or conduits were disconnected from the cable hoist or hydraulic power unit respectively and the cable hoist or hydraulic power units was left mounted on the tractor which interfered with efficient operation of said other implements.

The implement of my invention is a complete self-contained unit having a cable hoist built into the front supporting carriage and the hoist derives its operating power from the rotation of the carriage wheel as the implement is drawn over the ground surface, therefore only a simple hitch is required to connect the scraper to a tractor for operation which may be readily disconnected when it is desired to use the tractor for other work. This feature is particularly useful and time saving to operators and contractors having a number of tractors because the scraper may be connected to any one of the tractors without mounting other apparatus on the tractor.

Another object of this invention is to provide control levers which extend forwardly from the front supporting carriage by means of which the traction power may be directed conveniently and at will, by the operator of the tractor, to the instrumentalities for controlling the degree of operation of the hauling scraper.

A further object is to provide control means in the traction operated device which are capable of easy and instantaneous action thereby facilitating the controlling of the operation of the implement to a finer degree of accuracy.

With these and other objects in view, the invention consists in the combination, correlation, and construction of parts, members and features which will be described in the specification and will be finally pointed out in the claims.

Referring to the drawings:

Figure 4 is a sectional elevation taken in the plane of line 4—4 in Figure 1 showing the scraper in the digging position.

Figure 5 is an enlarged cross sectional detail of the lower cross member of the frame structure.

Figure 6 is an enlarged fragmentary side elevation partly in section of the front wheeled carriage showing the details of the traction power unit.

Figure 7 is a section on line 7—7 of Figure 6.

Figure 8 is an enlarged section taken on line 8—8 in Figure 6.

Figure 9 is a section taken on line 9—9 in Figure 6.

Figure 10 is a section taken on line 10—10 in Figure 8 showing the neutral position of the brake and clutch control lever as used when the implement is performing any one of its various operations.

Figure 11 is a view similar to Figure 10 showing the brake and clutch controlled lever in the clutch operating position for transmitting traction power from the wheel to the cable drum.

Figure 12 is a view similar to Figure 10 showing the brake and clutch control lever in the brake releasing position for lowering the implement.

Figure 13 is a diagram showing the cable arrangement for operating the scraper bowl and apron.

Figure 14 is a diagram showing the frame raising cable arrangement.

Figure 1:
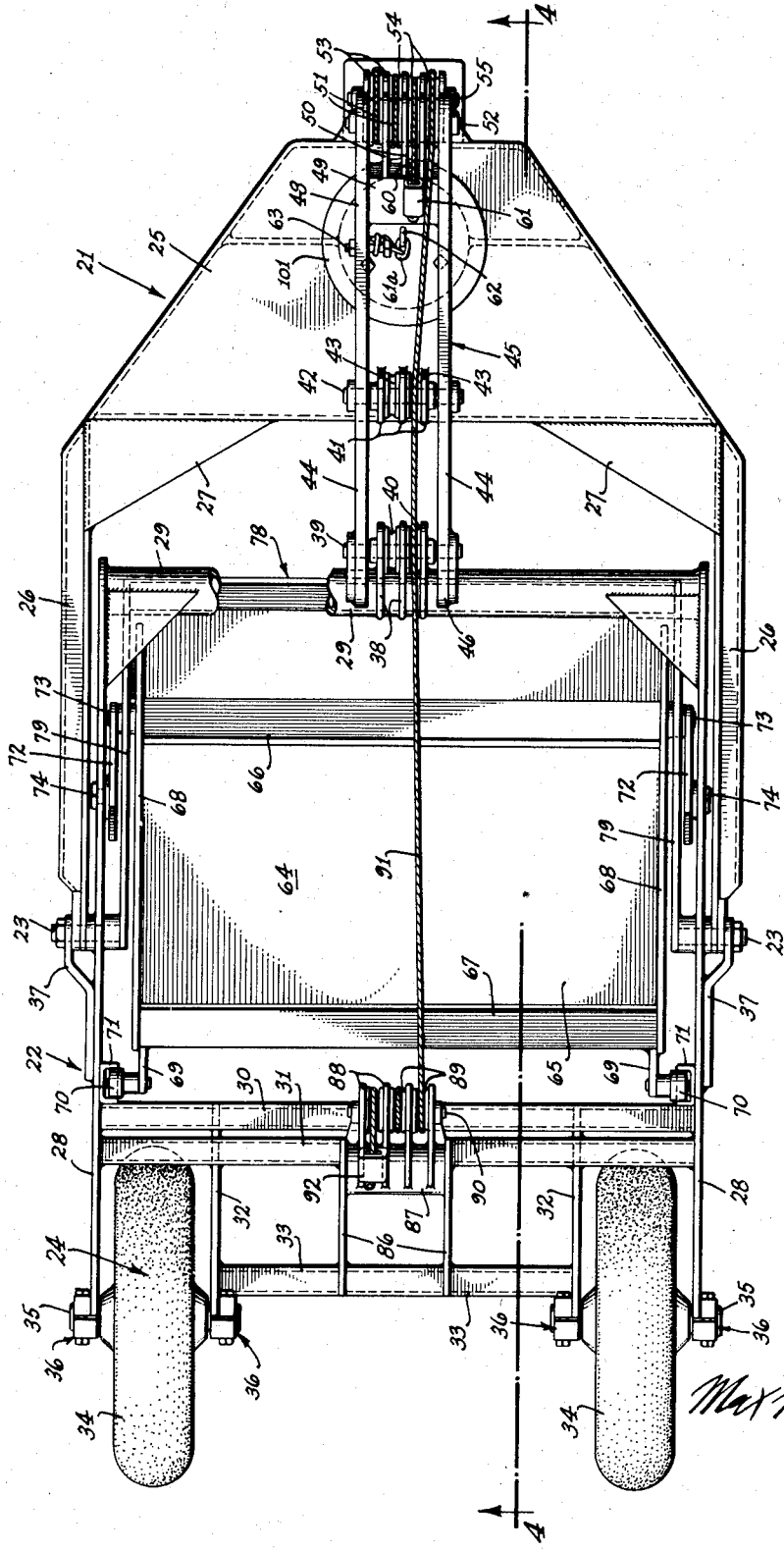
Figure 1 is a plain view of a scraper embodying my invention.
Figure 2:
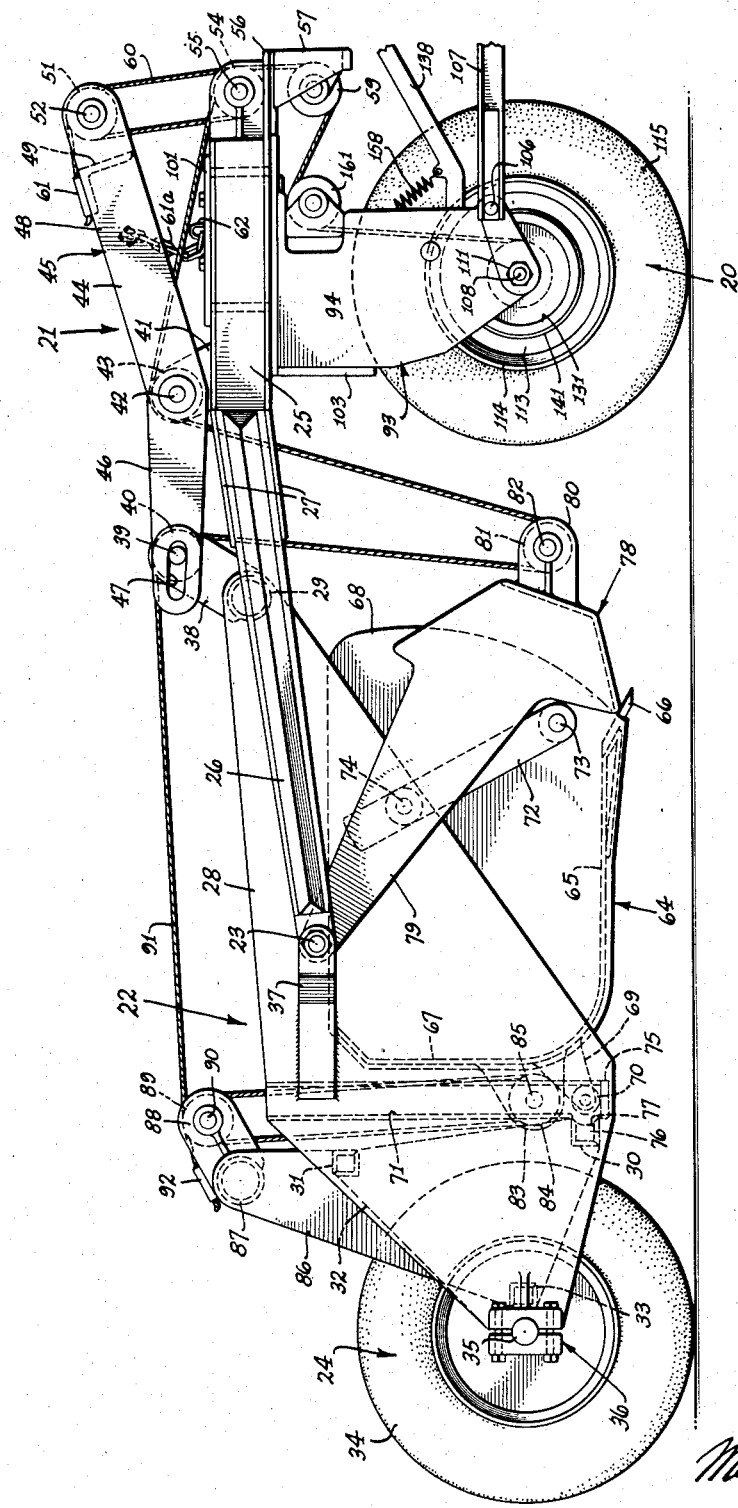
Figure 2 is a side elevation of the scraper in the load carrying position.

The invention exemplified in the drawings in one of its practical forms of embodiment comprises a front wheel carriage indicated generally at 20 in which is incorporated a traction operated cable hoist adapted to control a scraper of the hauling type. It is understood, however, that a traction operated hoist of this invention may be used for operating any other type of implement where power is required to control the degree of its operation.

The hauling scraper illustrated in the drawings is an improvement in the type of scraper shown and described in my application for Letters Patent, Serial No. 255,885 filed February 11, 1939. The scraper comprises a front frame section generally indicated at 21 and a rear frame section indicated at 22, which are hingedly connected together by pivot pins 23. The front end of frame section 21 is supported on the front wheeled carriage 20 and the rear end of frame section 22 is supported on a rear wheeled carriage 24.

The front frame section 21 includes a transverse frame member 25 which is substantially triangular in contour and is fabricated from steel plates to form a hollow boxed-in structure. Each end of the transverse frame member 25 is provided with a rearwardly extending arm 26 forming a U shaped structure. The arms 26 are securely braced with respect to the frame member 25 by means of reinforcing webs 27.

The rear frame section 22 includes a pair of side plates 28 which are substantially of a trapezium like contour and are maintained in a spaced apart relation by means of a tubular cross member 29 at the front of said side plates and by a lower cross member 30 and an upper cross member 31 near the rear end of said side plates. Secured by welding to the lower and upper cross members 30 and 31 respectively is a pair of spaced apart triangular plate members 32 which extend rearwardly and are interconnected at the rear ends by a cross member 33. The plate members 32 are spaced inwardly from the side plates 28 to provide spaces between the plate members 32 and side plates 28 for wheels 34 which comprise the rear wheeled carriage 24. The wheels 34 are journaled on axles 35 which are secured to the rear ends of plate members 32 and side plates 28 as shown at 36.

As may be observed in Figure 1, the front frame member arms 26 are positioned outside of the side plates 28 and are hingedly connected at the rear ends to said side plates 28 by means of the pivot pins 23. Brackets 37 are secured to the side lates 28 to support the pivot pins 23 at the outer sides of arms 26, thus the pins 23 are supported at both sides of the arms 26 thereby providing maximum rigidity and strength at the hinged connection.

A lever mechanism is provided for raising and lowering the frame of the scraper, and said mechanism includes three spaced apart lobes 38 secured to the tubular cross member 29 of the rear frame section 22. The lobes 38 are positioned centrally between the ends of cross member 29 and extend upwardly from the tubular cross member and are slightly inclined toward the front. The upper ends of lobes 38 carry a shaft 39 on which are journaled two sheaves 40 in an interposed relation between the lobes 38. The ends of shaft 39 extend outwardly beyond the outer lobes 38.

Three spaced apart and upwardly extending lobes 41 are secured to the transverse member 25 of a front frame section 21. The lobes 41 are aligned with the lobes 38 on the rear frame section 32 and carry a shaft 42 on which are journaled two sheaves 43 in an interposed relation between said lobes 41. The ends of shaft 42 extend beyond the outer lobes 41 and carry pivoted thereon a pair of spaced apart lever members 44 of the raising and lowering lever 45. The lever members 44 comprise rearwardly extending arms 46 having at the ends thereof slots 47 for slidably engaging the ends of the shaft 39. The lever members 44 are also provided with upwardly and forwardly extending arms 48 which are interconnected by a reinforcing angle member 49 which maintains said lever members in a spaced apart relation. The angle member 49 has secured thereto three forwardly extending lobes 50 which are aligned with the front ends of arms 48 and are spaced apart with relation to themselves and to the ends of arms 48 to form four spaces for four sheaves 51. The sheaves 51 are journaled on a shaft 52 which is mounted in the forward ends of the lobes 50 and arms 48.

Secured to the front edge of the transverse frame member 21 are five spaced apart lobes 53 which extend forwardly and carry interposed therebetween four sheaves 54 which in turn are journaled on a shaft 55 mounted in the lobes 53. Secured to the lower edges of lobes 53 is a horizontal plate 56 which in turn carries a downwardly extending bracket 57 which is attached to the plate 56 by means of bolts 58 and supports a pair of swiveled sheaves 59. A cable 60 is deadended or anchored at one end by fastening it to the angle member 49 as at 61, and is reaved between the three sheaves 51 and the three sheaves 54 and passed through one of the swiveled sheaves 59 and connected to a hoist drum as will be described hereinafter. By imparting a pulling force to the cable 60 a block and tackle effect is obtained between sheaves 51 and 54 which causes the lever 45 to impart a raising movement to the scraper frame and by releasing cable 60 the implement is lowered by gravity.

A chain 61a is anchored at one end on the transverse member 25 as by means of a U bolt 62 while the other end is connected to one of the lever members 44 by means of bolt 63. This chain serves to limit the vertically swinging movement of the lever arms 48 thereby providing a positive stop for the lowered position of the implement. This lowered position may be adjusted at will according to the desired depth of digging by passing the bolt 63 through a corresponding link in the chain 61.

The rear frame section 22 is provided with a scraper bowl 64 which includes a bottom 65 having at the forward edge thereof a scraper blade 66 and at the rear a back 67. The bowl 64 is also provided with side plates 68. The back 67 of the bowl 64 is provided at each side near the bottom thereof with rearwardly extending arms 69. Each arm 69 having an outwardly extending roller 70 mounted at the end thereof. Rollers 70 are adapted to engage vertical channels 71 secured to the inner faces of the side plates 28. The forward end of the bowl 64 is supported on links 72 which are pivotally connected at their lower ends to the side plates 68 of the bowl, as at 73 and near their upper ends are pivotally mounted on the rear frame side plates 28, as shown at 74. The bottom ends of channels 71 are provided with stop members 75 to limit the downward travel of the rollers 70 thereby maintaining the lowered position of the rear end of the bowl in a fixed relation to the rear frame section 22. The lower cross member 30 of the rear frame section 22 is provided with stop blocks 76 at each end thereof which are cut away, as at 77, (see Figures 4 and 5) to provide detent notches for the rollers 70 at the back of bowl 64. The detent notches 77 prevent the rear end of the bowl from raising under the influence of the rearward pressure resultant from the digging force exerted on the blade 66.

The front end of bowl 64 is provided with a closure or apron 78 for retaining the load in the bowl during transportation. The closure 78 is provided with rearwardly extending side arms 79 which are connected to the pivot pins 23 for a vertically swinging movement. The closure 78 is provided with a pair of forwardly extending lobes 80 which are positioned centrally between the sides of said closure and carry interposed therebetween a sheave 81 which in turn is journaled on shaft 82 mounted in said lobes 80. The back 67 of bowl 64 carries centrally disposed between the sides thereof three rearwardly extending lobes 83 which are spaced apart to provide spaces therebetween for two sheaves 84 which are journaled on a shaft 85 mounted in said lobes.

The rear frame structure 22 is provided at the rear thereof with a pair of spaced apart brackets 86 which are securely mounted between the lower and upper cross member 30 and 31 and the cross member 33. The brackets 86 are disposed centrally between the sides of the frame structure 22 and extend upwardly above said frame structure. The upper ends of brackets 86 are interconnected by means of a tubular cross member 87 which carries four forwardly extending lobes 88. The lobes 88 are spaced apart to provide spaces therebetween for three sheaves 89 which in turn are journaled on shaft 90 mounted in said lobes. The sheaves 89 are in line with sheaves 84 on the back of bowl 64.

A cable 91 is dead-ended by fastening one end thereof to the lobes 88, as shown at 92 and is reaved between the sheaves 89 and 84 to provide a block and tackle effect between the bowl 64 and the rear frame structure 22. The cable is then passed over one of the sheaves 40 at the front of the frame structure 22 and under the sheave 81 on the bowl closure 78 then over one of the sheaves 43 and one of the sheaves 54 on the front frame structure 22 then the cable is passed through one of the swivel sheaves 59 to be connected to a hoist drum which will be described hereinafter.

Upon application of a pulling force to the cable 91 the bowl closure 78 will be raised first by reason of its light weight then upon further pulling of the cable, the bowl 64 will be tilted by raising the back of said bowl vertically by reason of the rollers 70 being guided vertically in the channels 71. As the back of the bowl is raised, the forward edge of the bowl swings rearwardly on the links 72 and thereby the bowl is tilted, as may be observed in Figure 3.

The front wheeled carriage 20 of this invention has a traction operated cable hoist incorporated therein and includes an inverted U shaped frame member 93 comprising a pair of vertical side members 94 which are secured at their upper ends to a cross member 95, the cross member 95 is a horizontal plate and is provided with a tubular spindle 96 which extends upwardly from the top of the plate cross member 95 and is journaled in a bearing 97 in the transverse frame member 25. The bearing 97 is constructed by cutting out round holes in the upper and lower plates 98 and 99 respectively, of the fabricated frame member 25 and interposing between said upper and lower plates a tubular sleeve 100 which forms the wall of the bearing 97. A disk 101 is secured on the top of the tubular spindle 96 by means of bolts 102 passed through the disk 101 and plate cross member 95. The disk 101 and cross member 95 in cooperation with the upper and lower plates 98 and 99 of the frame member 25 serve as retaining flanges for the spindle 96. The vertical side members 94 are reinforced by means of a transverse plate 103 welded to the rear edges of side member 94 and to the cross member 95, as may be seen in Figure 6.

The lower ends of side members 94 carry on axle 104 on which is journaled a wheel 105 which may be of any suitable type. It is, however, preferred to use a rubber tired wheel as illustrated on the drawings.

The wheel 105 is positioned to the rear of the vertical axis of the spindle 96 thereby effecting a caster-like action in the carriage 20 to facilitate the trailing of the scraper behind the tractor.

Figure 3:
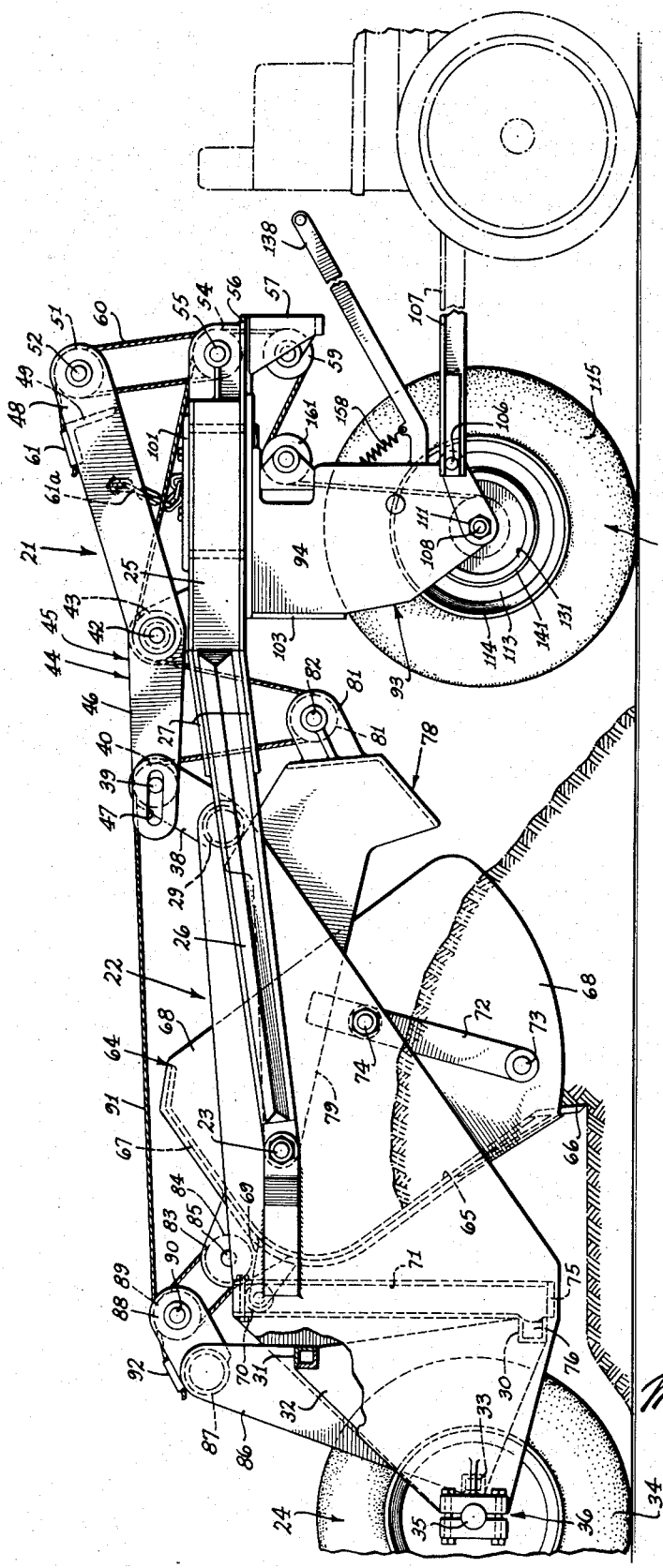
Figure 3 is a side elevation of the scraper in the load dumping and spreading position.

Connected to the side members 94 of the carriage 20, as at 106, is a bifurcated hitch member 107 adapted for connection to the usual draw bar of a tractor (see Figures 3 and 9).

The axle 104 is stationary and comprises a shaft 108 supported in holes 109 at the lower ends of side members 94. A spacer sleeve 110 is mounted on the shaft 108 and is clamped securely between the side members 94 by means of nuts 111 which are screwed on the threaded ends of the shaft 108. The nuts 111 may be of the castellated variety so that they may be retained in the tightened position by means of conventional cotter pins 112 (see Figure 8).

The wheel 105 includes a disk portion 113 carrying at the outer periphery thereof a tire rim 114 on which a tire 115 is mounted in the usual manner.

The wheel disk 113 is provided with a hub 116 which extends outwardly from both sides of said disk. The hub 116 is counterbored at each end to provide retainer shoulders 117 for anti-friction bearings 118 which support the wheel 105 on the sleeve 110. Retainer rings 119 are positioned on the sleeve 110 to maintain the anti-friction bearings 118 in place and said retainer rings 119 are held in position by means of nuts 120 which are screwed on the threaded portions 121 of the sleeve 110.

The wheel disk 113 is provided at each side thereof with outwardly extending annular rims 122 in which the inner wall surface is of conical shape.

Rotatably mounted on each of the two outwardly extending portions of the wheel hub 116 is a drum member 123. The hub portion of each drum member is bored out as at 124 and has a bushing 125 of anti-friction metal pressed therein to facilitate rotation on the outer periphery of the hub 116.

Each of the two drum members 123 is provided at the inner end with a cone element 126 which may be surfaced with suitable friction producing material, as indicated at 127. The cone element 126 is adapted for engagement with the corresponding conical rim 122 on the wheel 105. The intermediate portion of each drum member 123 is provided with a cable drum 128 having inner and outer cable retaining flanges 129 and 130 respectively. The outer portion of each drum member is provided with brake drum 131 which is an integral part of the outer cable drum flange 130.

The outer ends of the drum member hubs are provided with inward flanges 132 which are counterbored, as at 133, for rotatably engaging flanges 134 of sleeves 135. The flanges 134 are maintained within the counterbores 133 by means of threaded retainer rings 136. The sleeves 135 are provided with internal threads for engagement with threads 137 at the ends of the axle sleeve 110. The threaded sleeves 135 are also provided with operating handles 138 which are clamped to said sleeves, as at 139, and extend forwardly toward the tractor for easy reach of the operator.

Operatively associated with the brake drums 131 are brake band mechanisms 140 which are of the self-energizing type and include a brake band 141 lined on the inner surface with conventional brake lining 142. Each of the two brake band mechanisms is identical in construction, therefore the following description will be directed to one of the mechanisms and similar parts in the other mechanism will be given the same reference numerals in the drawings. Each brake band 140 encircles a major portion of the brake drum periphery and is arranged so that the gap between the brake band ends is positioned at the top of the brake drum. The rear end of brake band 141 is pivotally connected to the forward end of a horizontal link 143, as at 144. The rear end of the link 143 is pivotally connected as at 145 to an adjusting bolt 146 which is passed through a suitable hole in a lug 147 extending inwardly from the side member 194. The bolt 146 is adjustably maintained in position by nuts 148 tightened against the opposite faces of the lug 147.

The front end of brake band 141 is pivotally connected as at 149 to a downwardly extending arm 150 off bell crank lever 151. The bell crank lever 151 is pivotally mounted as at 152 on the inner face of the side member 94 and is provided with a rearwardly extending arm 153. A vertically positioned tension spring 154 is connected at its lower end to the rear end of the arm 153 and at its upper end to a depending lug 155 on the bottom face of the plate member 95. The tension spring 154 normally maintains the brake band 141 tightened against the periphery of the brake drum 131. The bell crank lever 151 is provided with a forwardly extending hooked pawl 156 adapted for engagement with a roller 157 mounted on the clutch control lever 138. A tension spring 158 is connected at one end to the clutch control lever 138 and at the other end to an inwardly extending lug 159 on the side member 94. The spring 158 normally urges the clutch control lever 138 upwardly so that the roller 157 bears against the pawl 156 of the bell crank lever 153 (see Figure 10). The clutch control lever spring 158 is of lighter tension than the bell crank spring 154 which permits the roller 157 to bear against pawl 156 of the bell crank 151 without releasing the brake band 141.

Each of the side members 94 is provided with an inwardly extending bracket 160 which is positioned below the plate member 95 to provide space for swivelably mounting a sheave 161 between said bracket 160 and plate member 95, as may be observed in Figures 6 and 7.

The bowl and apron controlling cable 91 is passed from the sheave 59 on the left side of the wheeled carriage 20 as viewed in Figure 7 through the swiveled sheave 161 to the cable drum 128 on which it is wound when the drum rotates in the clockwise direction, as viewed in Figure 6.

The frame raising cable 60 is passed from the sheave 59 on the right side of the wheeled carriage 20, as viewed in Figure 7, through the swiveled sheave 161 to the cable drum 128 on which it is wound similar to the cable 91.

The operation of the traction power unit is as follows:

When the scraper is performing any one of its operations like, for instance, scraping or digging, load carrying, dumping, leveling, etc., the control levers 138 are held in the neutral position by the influence of the springs 158 which causes the rollers 157 on the levers 138 to bear against the pawls 156, as illustrated in Figure 10. When the levers 138 are in the neutral position, the clutch cones 126 are out of engagement with the clutch rings 122 on the wheel 105 so that said wheel rotates freely on the axle 104. Due to the weight of the bowl and of the frame, cables 91 and 60 respectively, have a tendency to unwind from the cable drums. As the cables unwind the cable drums are rotated in the anti-clockwise direction, as viewed in Figure 10. The brake band mechanism 140 is self-energizing by the anti-clockwise rotation of brake drums 131 so that the brake bands 141 automatically tighten about the drums 131 thus preventing anti-clockwise rotation of cable drums 138 and thereby maintaining the bowl and the frame in its set position.

When it is desired to raise or tilt the scraper bowl the right or the left lever 138 respectively, is pushed down as shown in Figure 11. The downward movement of lever 138 rotates the sleeve 135 which under the influence of the thread 138 on axle sleeve 110 pushes the drum member 123 inwardly until the clutch cone 126 engages the clutch ring 122 on the wheel 105 thus connecting the cable drum 138 with the wheel for clockwise rotation therewith as the implement is drawn over the ground surface and thereby raising or tilting the bowl. After the desired elevation or tilt of the bowl is obtained, the lever 138 is released to return to its neutral position thereby disconnecting the clutch and stopping the winding of the cable on the drum. When the cone clutch is released, the cable drum has a tendency to rotate anti-clockwise by reason of the weight of the bowl or of the frame tending to unwind the cable from said drum. This anticlockwise rotation is instantaneously and automatically stopped immediately upon its inception by means of the self-energizing brake mechanism and thereby the bowl is maintained in its elevated or tilted position.

When it is desired to lower the scraper bowl or return it to the horizontal position, the right or the left lever 138 respectively, is pulled up as shown in Figure 12. The upward movement of the lever 138 causes the roller 157 to raise the pawl 156 of the bell crank lever 151 thereby swinging the bell crank lever about pivot 152 in anti-clockwise direction, as viewed in Figure 12. This movement of the bell crank lever causes the arm 150 to swing forwardly, releasing the brake band 141 from the brake drum which permits the cable to unwind from the cable drum by reason of the weight of the frame or the bowl. After the bowl has reached the desired position, the unwinding of the cable is stopped by pushing the lever 138 down to the neutral position in Figure 10.

From the foregoing description it will be seen that I have provided by means of this invention a new and useful traction power operated scraper comprising a hauling scraper having a cable hoist incorporated therein which derives its operating power from the rotation of the front supporting wheel as the scraper is drawn over the ground surface. The traction power may be directed conveniently and at will by the operator of the tractor to the instrumentalities controlling the degree of operation. The hauling scraper of this invention is a complete unit within itself and requires only a simple connection to the tractor for operation.

Having thus described my invention I claim:

1. In a hauling scraper including a frame adapted for connection to a tractor, a scraper bowl on said frame, front and rear wheeled supports for said frame, said front wheeled support comprising a wheel, a cable drum at each side of said wheel, a cable connecting one cable drum to the frame, a cable connecting the other cable drum to the bowl, clutch means between said cable drums and said wheel adapted for engagement with said wheel to rotate the cable drums as the scraper is drawn over the ground surface for raising said frame and tilting said bowl, means for controlling the engagement and disengagement of said clutch means, a brake mechanism for each cable drum arranged to automatically hold the cable drums against unwinding when the clutch means are disengaged, means for manually releasing said brake mechanism to lower said frame and return the bowl to the digging position.

2. In a hauling scraper including a frame adapted for connection to a tractor, a scraper bowl on said frame, a closure for the front end of said bowl, front and rear wheeled supports for said frame, said front wheeled support comprising a wheel, a cable drum at each side of said wheel, a cable connecting the frame to one cable drum, a cable connecting the bowl and its closure to the other cable drum, clutch means between said cable drums and said wheel adapted for engagement with the wheel to rotate the cable drums as the scraper is drawn over the ground surface thereby winding said cables to raise the frame and open the bowl closure and tilt the bowl, means for controlling the engagement and disengagement of said clutch means, a brake mechanism for each cable drum arranged to automatically hold the cable drums against unwinding when the clutch means are disengaged, means for manually releasing said brake mechanisms to lower said frame, return said bowl to the digging position and operate said bowl closure.

3. A hauling scraper comprising a frame adapted for connection to a tractor, a scraper bowl mounted on said frame, a closure for said bowl, front and rear wheeled supports for said frame, traction operated power means incorporated in the front wheeled support, means connecting said power means to the frame for raising and lowering same, means connecting said power means to the bowl and the bowl closure for actuating said bowl closure and tilting said bowl, control means mounted on said power unit for regulating the raising and lowering of the frame, the actuation of the bowl closure and the tilting of the bowl from the tractor.

4. A hauling scraper comprising a frame adapted for connection to a tractor, a scraper bowl mounted on said frame, a closure for the front end of the bowl, front and rear wheeled supports for said frame, traction operated cable hoist incorporated in the front wheeled support, cable means connecting said frame to the hoist for raising and lowering said frame, cable means connecting the bowl and the bowl closure to the hoist for actuating said closure and tilting said bowl, control means mounted on the front wheeled support and associated with said hoist for regulating the raising and lowering of the frame, the actuation of the bowl closure and the tilting of the bowl from the tractor.

5. A hauling scraper comprising a frame adapted for connection to a tractor, a scraper bowl mounted on said frame, front and rear wheeled supports for said frame, traction operated power means incorporated in the front wheeled support, means connecting said power means to the frame for raising and lowering same and means connecting said power means to the bowl for tilting said bowl, control means mounted on said power unit for regulating the raising and lowering of the frame and tilting the bowl from the tractor.

6. A hauling scraper comprising a frame adapted for connection to a tractor, a scraper bowl mounted on said frame, front and rear wheeled supports for said frame, traction operated cable hoist incorporated in the front wheeled support, cable means connecting said frame to the hoist for raising and lowering same, cable means connecting the bowl to the hoist for tilting said bowl, control means mounted on the front wheeled support and associated with said hoist for regulating the raising and lowering of the frame and tilting the bowl from the tractor.

7. In a hauling scraper comprising a front frame section and a rear frame section hingedly connected together, a wheeled carriage supporting the front frame section, a wheeled carriage supporting the rear frame section, a scraper bowl, link means swingingly supporting the front of said bowl on the rear frame section, means for guiding the rear end of the bowl in the vertical plane, cable power means between the rear end of said bowl and the rear frame section for imparting vertical movement to the rear end of the bowl and consequently swinging the front end of said bowl rearwardly on said link means thereby tilting said bowl, detent means on the rear frame section arranged to cooperate with the rear end of said bowl for preventing said rear end from swinging upwardly under the influence of the digging pressure, cable means on said front frame section associated with the rear frame section for imparting a raising movement to said rear frame section.

8. In a hauling scraper comprising a front and rear frame section hingedly connected together, wheeled carriages for supporting said front and rear frame sections, a scraper bowl, link means swingingly supporting the front of said bowl on the rear frame section, roller means at the rear of said bowl cooperating with vertical channels on the rear frame section for guiding the rear end of said bowl in the vertical plane, cable power means between the rear of said bowl and the rear frame section for imparting vertical movement to the rear of said bowl and thereby swinging the front of said bowl rearwardly on said link means thereby tilting said bowl, detent means on the rear frame section cooperating with said roller means to prevent tilting of said bowl under the influence of the digging pressure, lever means mounted on the front frame section and connected to the rear frame section, cable power means between said front frame section and said lever means for raising and lowering the rear frame section.

9. In a hauling scraper comprising a front and rear frame section hingedly connected together, wheeled carriages for supporting said front and rear frame sections, a scraper bowl, a closure for the front end of said bowl, link means swingingly supporting the front of said bowl on the rear frame section, roller means at the rear of said bowl cooperating with vertical channels on the rear frame section for guiding the rear of said bowl in the vertical plane, detent means on the rear frame section cooperating with said roller means to prevent tilting of said bowl under the digging pressure, lever means mounted on the front frame section and connected to the rear frame section, a traction operated cable hoist incorporated in the front wheeled carriage, a cable associated with said bowl, said rear frame section, said bowl closure and connected to said hoist for controlling the bowl and the bowl closure, a cable associated with said lever means, said front frame section and connected to said hoist for raising and lowering said rear frame section.

10. In a ground working implement adapted for connection to a tractor, a frame, front and rear wheeled carriages for supporting said frame, traction operated power means incorporated in the front wheeled carriage, a ground working element supported on said frame between said wheeled carriages so that the implement tilts forwardly about the ground working element when said element is in contact with the ground to utilize the weight of the rear carriage and the frame to assist said element in penetrating the ground and at the same time maintain traction pressure proportionate to the degree of operation of said implement between the front wheeled carriage and the ground surface.

11. In a scraping implement adapted for connection to a tractor to be drawn over the ground surface, a frame, front and rear wheeled carriages for supporting said frame, traction operated power means incorporated in the front wheeled carriage, a scraper bowl supported on said frame between said wheeled carriages so that the edge of said scraper bowl acts as a fulcrum for the entire implement to raise the rear end of the implement and apply pressure to the scraper bowl and the front wheeled carriage against the ground surface during the scraping operation.

MAX M. BRODERSEN.